United States Patent [19]

Gawol et al.

[11] Patent Number: 4,840,668

[45] Date of Patent: Jun. 20, 1989

[54] CORROSION-INHIBITING PIGMENTS, THEIR PRODUCTION AND USE

[75] Inventors: Manfred Gawol, Clausthal-Zellerfeld; Gerhard Adrian, Goslar, both of Fed. Rep. of Germany

[73] Assignee: Dr. Hans Heubach GmbH & Co. KG, Langelsheim, Fed. Rep. of Germany

[21] Appl. No.: 116,723

[22] PCT Filed: Feb. 13, 1987

[86] PCT No.: PCT/EP87/00071

§ 371 Date: Sep. 30, 1987

§ 102(e) Date: Sep. 30, 1987

[87] PCT Pub. No.: WO87/05040

PCT Pub. Date: Aug. 27, 1987

[30] Foreign Application Priority Data

Feb. 20, 1986 [DE] Fed. Rep. of Germany ....... 3605526

[51] Int. Cl.$^4$ .................... C09D 5/08; C04B 14/34; C09C 1/00
[52] U.S. Cl. .................. 106/14.21; 106/404; 106/425; 106/439; 106/441; 106/453; 106/456; 106/479
[58] Field of Search ............... 106/14.21, 1.12, 308 Q, 106/290, 309, 296, 302, 299, 300, 287.17, 404, 425, 439, 441, 453, 456, 479; 427/383.3; 252/387, 389.5, 389.52, 389.53, 389.54, 396

[56] References Cited

U.S. PATENT DOCUMENTS

| | | | |
|---|---|---|---|
| 2,172,505 | 9/1939 | Gardner | 106/308 Q |
| 3,248,251 | 4/1966 | Allen | 106/14.21 |
| 3,443,977 | 5/1969 | Bennetch | 106/302 |
| 3,656,975 | 4/1972 | Phelps, Jr. et al. | 106/14.21 |
| 3,874,883 | 5/1975 | Robitaille et al. | 106/14.21 |
| 3,963,472 | 6/1976 | Young | 106/14.21 |
| 3,969,127 | 8/1976 | Robitaille et al. | 106/14.21 |
| 4,017,315 | 5/1977 | Vukasovich et al. | 106/14.21 |

FOREIGN PATENT DOCUMENTS

| | | |
|---|---|---|
| 1162727 | 2/1984 | Canada . |
| 667135 | 11/1938 | Fed. Rep. of Germany . |
| 3046697 | 12/1980 | Fed. Rep. of Germany . |
| 1082 of 1952 | | German Democratic Rep. |

Primary Examiner—Prince E. Willis
Assistant Examiner—Helene Kirschner
Attorney, Agent, or Firm—Browdy and Neimark

[57] ABSTRACT

The invention relates to corrosion-inhibiting pigments containing metallic oxides, phosphates and/or molybdates, wherein the metals are zinc, aluminum, iron, barium, strontium, calcium, magnesium and titanium, singly or in combination, wherein the pigments also contain 0.03–2% by weight of soluble sodium dichromate or equivalent amounts of potassium dichromate, ammonium dichromate or equivalent amounts of respective chromates or chromic acid, singly or in their mixture. The invention also relates to a process for the manufacture of the pigments by thorough homogenization of the chromate components with the pigments, and to the use of the pigments in primers for ferrous and non-ferrous metallic substrates.

11 Claims, No Drawings

CORROSION-INHIBITING PIGMENTS, THEIR PRODUCTION AND USE

In the production of varnishes and paints for coating non-ferrous metal substrates, but also, particularly, structures and vehicles made of various metals such as steel, galvanized steel and aluminum, zinc chromate and strontium chromate have thus far been depended upon as the only two compounds providing the required adhesion of coatings, particlarly on aluminum.

Research efforts aimed at substituting zinc and strontium chromate pigments, rated as carcinogenic substances, by zinc phosphate pigments or modified zinc phosphate pigments for the above-defined applications have not been successful. First of all, the very good adhesion properties of zinc chromate and strontium chromate on various aluminum alloys under weathering test conditions could not be matched thus far by using phosphate pigments.

It is an object of the present invention to provide environmentally harmless corrosion-inhibiting pigments, the pigments in particular being less objectionable from the standpoint of industrial medicine, and capable of substituting zinc chromate and strontium chromate, especially in priming coats for various metal substrates.

It has been determined that modified basic phosphate pigments exhibiting optimum effectiveness when applied on steel substrates can be significantly improved to be applicable with good results also on light-metal substrates by combining the pigments with very small amounts of soluble dichromates or chromates of alkali metals, ammonium dichromate or chromate, or chromic acid.

The small amounts of soluble chromates or chromic acid added to primers as pigments markedly improve the adhesion and rust protection properties of the priming coats.

It is even possible to keep the percentage of soluble dichromates or chromic acid so low that the concentration range of the material as per its specification will not be changed.

The invention provides, accordingly, corrosion-inhibiting pigments containing metallic oxides, phosphates and/or molybdates, preferably basic pigments containing metallic phosphates and molybdates with the metals being zinc, aluminum, iron, barium, strontium, calcium, magnesium and titanium, singly or in combination, which, beside metallic oxide, metallic phosphate and/or metallic molybdate also contain 0.03–2% by weight, preferably 0.2–0.6% of soluble sodium dichromate, or equivalent amounts of potassium or ammonium dichromates or equivalent amounts of respective chromate or chromic acid in relation to the total weight of the pigment.

Efforts were made to develop pigments containing certain amounts of soluble chromates by combining the phosphate pigments with zinc chromate or strontium chromate. However, the resulting pigments only matched the quality of the pigments of this invention when the percentage of strontium chromate and zinc chromate was very high, the amount of chromates in those pigments thus being higher by several orders of magnitude than in the pigments of the present invention.

Attempts have been made for a long time to combine phosphates or oxides with chromate. According to German Patent (DE) 667 135, a pigment can be obtained by saturation of an adsorptive powdery material with aqueous solutions of chromic acid or chromates with subsequent drying and grinding. This method, however, requires ca. 25% to 53% of chromic acid or chromates in relation to the adsorptive powdery material or 20% to 35% in relation to the final pigment. Such an amount is intolerable from the standpoint of industrial medicine.

According to DD-PS 1082, lead chromate is combined with a carrier wherein the resulting amount of insoluble lead chromate (no soluble chromate radical) is from 5% to 11% [percent] by weight. It is also known to use chromates in the form of permanently adsorbed matter or in an insoluble form. However, it is new and unexpected to find out that the rust-protection properties can be significantly improved over the prior art by using very low amounts of soluble chromium compounds, since it was determined that at higher percentages (over 2%, especially over 5%) not only does the soluble compound get leached out but also increased blistering of the coating films takes place during the weathering tests. Hence, it has not been obvious to reduce the known amounts of 5% and more, objectionable from a medicinal viewpoint, to amounts which are not risky or barely objectionable from that viewpoint, and still achieve better results.

A particularly effective example of the invention appears to be a combination of basic metallic phosphate pigments with soluble alkali metal dichromate or chromate or ammonium dichromate or chromate, or chromic acid, when the compounds are mixed thoroughly with the base pigment slurry after the chemical reaction and wet conditioning and before drying, the mixing being carried out, in particular, employing shearing forces. In this way, a uniform distribution of the dissolved chromate component, necessary for an optimum effectiveness of the product, can be attained.

A uniform, optimum distribution of a chromate compound in the pigment or in a pigment combination can also be obtained by way of dry mixing of the components. In this case, however, intensive pulverizing must follow, e.g. in a pinned disk mill, turbo-grinder or a jet mill. Such upgrading treatment of the dry pigment can also be advantageous when applied to the mixture of chromates and wet pigment before drying. In both cases, it may be expedient to provide screen classification to ensure fractions of specified particle size to be separated for particular applications.

Another preferable variant of the combination of a corrosion-inhibiting pigment with the above-specified amounts of chromates includes adding to the pigment slurry before drying or to the dry pigment after the chromates are added, other pigments and/or fillers such as titanium dioxide, barium sulfate or talcum etc., which are usually employed during blending of primers. These other pigments and fillers can also be added before the addition of the soluble chromium compounds. The amount of such admixture is preferably 5 to 20% by weight, especially 15 to 20% of the total pigment weight.

In a preferable embodiment of the invention, phthalic acid or phthalic anhydride is added in an amount up to 10% by weight, especially 0.3 to 3%, with heating if necessary, to the wet pigment after the chemical reaction or to the dry pigment. Subsequently, the chromates are added as described in DE-AS No. 30 46 697 for such pigments without soluble chromium compounds.

The chromate components can also be added to a finished pigment or primer. A sufficient homogenization can often be achieved by using a high-speed mixer commonly used in the preparation of paint compositions. If this is not the case, the primer may be comminuted together with the admixed chromate components.

The invention is further explained by the following examples.

EXAMPLE 1

100 kg zinc oxide is made into a suspension with 800 l of water in an agitator and reacted with 71 kg of 71% phosphoric acid during ca. 2 hours to produce basic zinc phosphate.

The pigment slurry is wet conditioned and then combined with 0.4% by weight (in relation to dry pigment) of sodium chromate. The mixture is homogenized in an intensive mixer and dried at 105° C. and then finished in a conventional manner, e.g. through grinding alone or grinding and screening.

EXAMPLE 2

Basic zinc phosphate is produced as in Example 1 and then the aqueous suspension is mixed with a near-boiling solution of 0.8% by weight of phthalic anhydride (in relation to dry pigment) and with 10 parts of water during a 30 min. time period. The product is then wet-conditioned, separated by filtration and combined with 0.3% by weight (in relation to dry pigment) of sodium dichromate. The mixture is homogenized in an intensive mixer, the pigment slurry is then dried at 105° C. and the dry product is finished by grinding or by grinding and screening.

EXAMPLE 3

Basic zinc phosphate is produced as in example 2, phthalic acid or phthalic anhydride are then added in the above described manner. The pigment slurry is combined with 10% by weight (in relation to dry pigment) of barium sulfate and 10% by weight (in relation to dry pigment) of talcum. Subsequently, 0.4% by weight (in relation to dry pigment) of sodium dichromate is added and an intensive mixing is carried out. The resulting pigment slurry is then dried at 105° C. and the dry product is subjected to grinding alone or grinding and screening.

EXAMPLE 4

The basic zinc phosphate with barium and talcum is prepared as in Example 3 and, without the addition of dichromate, dried at 105° C. The dry mixture is then prepared and combined with 0.4% by weight of ammonium dichromate. The resulting product is subjected to an intensive premixing and finally to grinding in a turbo-grinder.

The products obtained in the above-described manner and containing soluble alkali metal dichromate or chromate or ammonium dichromate or chromate respectively were tested after 1200 hours in the salt-spray test. The following composition (recipe) was prepared as primer for commercial vehicles of a composite type of construction, on metal substrates such as steel, galvanized steel and aluminum, wherein the thickness of the dry coating was 90-100 μm.

Recipe for two-component coating using the pigment of the invention for commercial vehicles of composite construction:

| Component A | parts by weight |
| --- | --- |
| Epoxy resin (equivalent weight 450-525) | 11.2 |
| Epoxy resin (equivalent weight 175-185) | 8.4 |
| Montmorillonite, organically modified | 1.15 |
| Wetting agent | 0.17 |
| Foam inhibitor | 0.08 |
| Zinc phosphate, chromate-modified (Example 2) | 19.6 |
| Barium sulfate (nat.) max. 10 μm | 17.0 |
| Magnesium silicate max. 15 μm | 5.4 |
| Titanium oxide | 8.0 |
| Methyl ethyl ketone | 12.5 |
| Xylene | 10.0 |
| Component B | |
| Modified aliphatic polyamine H-active - equivalent weight 80 | 6.5 |
| | 100.0 |
| Pigment volume concentration (PVK), % = | 39 |
| PVK/KPVK (critical pigment volume concentration) = | 0.7 |
| Solids content, % = | 74 |

Corresponding primers containing zinc chromate and strontium chromate were produced and tested in a similar manner for comparison. In a composite evaluation including adhesion, rusting and blistering, primers containing the pigments of the invention yielded practically the same results as the primers pigmented with zinc chromate and strontium chromate.

The embodiments of the invention in which an exclusive property or privilege is claimed are defined as follows:

1. A corrosion inhibiting pigment for paints and varnishes compatible with galvanized steel substrates, non-galvanized steel substrates as well as aluminum substrates, said pigment consisting essentially of:
   a first component selected from the group consisting of metallic oxides, metallic phosphates, metallic molybdates and mixtures thereof, wherein the metal is at least one member selected from the group consisting of zinc, aluminum, iron, barium, strontium, calcium, magnesium and titanium; and
   soluble chromate in an amount equivalent to 0.03-0.6 weight percent sodium dichromate based on the total weight of the pigment, said soluble chromate being in the form of a compound selected from the group consisting of sodium dichromate, potassium dichromate, ammonium dichromate, sodium chromate, potassium chromate, ammonium chromate, potassium chromate, chromic acid and mixtures thereof, said pigment being compatible with galvanized steel substrates, non-galvanized steel substrates as well as aluminum substrates.

2. A pigment according to claim 1, further comprising other pigments or fillers selected from the group consisting of titanium dioxide, barium sulfate, and talcum in amounts from 1 to 40% by weight in relation to the total weight of the pigment, the substances being added to the first component before or after the addition of the soluble chromate thereto.

3. A pigment according to claim 1, further comprising 0.3 to 10% phthalic acid or phthalic anhydride by weight.

4. A pigment according to claim 3, wherein said first component is a basic metallic phosphate.

5. A pigment according to claim 3, produced by adding said phthalic acid or phthalic anhydride to said first component and then adding said soluble chromate on top of the first component.

6. A process for manufacturing a pigment, for paints and varnishes compatible with galvanized steel substrates, non-galvanized steel substrates, as well as aluminum substrates, said process consisting essentially of:
   forming a slurry consisting essentially of a first component selected from the group consisting of metallic oxides, metallic phosphates, metallic molybdates and mixtures thereof, wherein the metal is at least one member selected from the group consisting of zinc, aluminum, iron, barium, strontium, calcium, magnesium and titanium;
   wet conditioning said first component in said slurry;
   adding to said wet conditioned first component in said slurry soluble chromate in an amount equivalent to 0.03 to 0.6 weight percent sodium dichromate, based on the total weight of the pigment, said soluble chromate being in the form of a compound selected from the group consisting of sodium dichromate, potassium dichromate, ammonium dichromate, sodium chromate, potassium chromate, ammonium chromate, chromic acid and mixtures thereof;
   homogenizing the thus formed mixture of the first component and soluble chromate; and
   drying the homogenized mixture.

7. A process according to claim 6 wherein phthalic acid or phthalic anhydride is added to the first component in an amount of 0.3-10% by weight, and then the soluble chromate is added thereto.

8. A process according to claim 6, wherein titanium dioxide, barium sulfate or talcum in amounts of 1 to 40% by weight are added to the first component before or after the addition of said soluble chromate.

9. A process for manufacturing a pigment for paints and varnishes compatible with galvanized steel substrates, non-galvanized steel substrates, as well as aluminum substrates, said process consisting essentially of:
   forming a slurry consisting essentially of a first component selected from the group consisting of metallic oxides, metallic phosphates, metallic molybdates and mixtures thereof, wherein the metal is at least one member selected from the group consisting of zinc, aluminum, iron barium strontium, calcium; magnesium and titanium;
   wet conditioning said first component in said slurry;
   drying said slurry after said wet conditioning to result in dried and conditioned first component;
   adding soluble chromate to said dried and conditioned first component in an amount equivalent to 0.03-0.6 weight percent sodium dichromate, based on the total weight of the pigment, said soluble chromate being in the form of a compound selected from the group consisting of sodium dichromate, potassium dichromate, ammonium dichromate, sodium chromate, potassium chromate, ammonium chromate, chromic acid and mixtures thereof; and
   drying pulverizing the mixture of said first component and the soluble chromate to uniformly distribute said soluble chromate throughout said mixture.

10. A process for manufacturing a pigment for paints and varnishes compatible with galvanized steel, non-galvanized steel, as well as aluminum substrates, said process consisting essentially of:
   selecting a dry first component from the group consisting of metallic oxides, metallic phosphates, metallic molybdates and mixtures thereof, wherein the metal is at least one member selected from the group consisting of zinc, aluminum, iron, barium, strontium, calcium, magnesium and titanium;
   adding soluble chromate to said dry first component in an amount equivalent to 0.03-0.6 weight percent sodium dichromate, based on the total weight of the pigment, said soluble chromate being in the form of a compound selected from the group consisting of sodium dichromate, potassium dichromate, ammonium dichromate, sodium chromate, potassium chromate, ammonium chromate, chromic acid and mixtures thereof; and
   drying pulverizing the mixture of said first compound and said soluble chromate to uniformly distribute said soluble chromate throughout said mixture.

11. In a pigment-containing paint or varnish usable on aluminum substrates, the improvement wherein said pigment consists essentially of;
   a first component selected from the group consisting of metallic oxides, metallic phosphates, metallic molybdates and mixtures thereof, wherein the metal is at least one member selected from the group consisting of zinc, aluminum, iron, barium, strontium, calcium magnesium and titanium; and
   soluble chromate, in an amount equivalent to 0.03-0.6 weight percent sodium dichromate, based on the total weight of the pigment, said soluble chromate being in the form of a compound selected from the group consisting of sodium dichromate, potassium dichromate, ammonium dichromate, sodium chromate, potassium chromate, ammonium chromate, potassium chromate, chromic acid and mixtures thereof, said pigment being compatible with aluminum substrates.

* * * * *